April 8, 1952 H. C. HARSH 2,592,514

MULTILAYER PHOTOGRAPHIC COLOR FILM IN WHICH AT LEAST ONE LAYER CONTAINS A MIXTURE OF CYAN, MAGENTA, AND YELLOW DYE IMAGE INTERMEDIATES

Filed May 7, 1947

INVENTOR.
HAROLD C. HARSH
BY Henry M. Coughlin
Henry B. Kellog
ATTORNEYS

Patented Apr. 8, 1952 2,592,514

UNITED STATES PATENT OFFICE 2,592,514

MULTILAYER PHOTOGRAPHIC COLOR FILM IN WHICH AT LEAST ONE LAYER CONTAINS A MIXTURE OF CYAN, MAGENTA, AND YELLOW DYE IMAGE INTERMEDIATES

Harold C. Harsh, Binghamton, N. Y., assignor to General Aniline & Film Corporation, New York, N. Y., a corporation of Delaware Application May 7, 1947, Serial No. 746,430

9 Claims. (Cl. 95—2)

Figure 1:
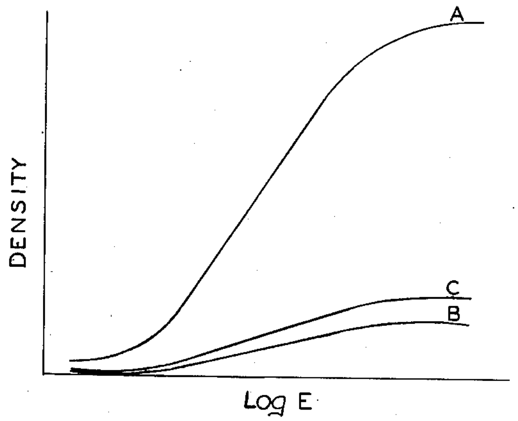

This invention relates to color photography, and more particularly to new multi-layer color films of the reversal or negative type containing equally degraded dye images in each of the individual layers.

It is known that a trichromatic system of reproduction utilizes three primary colors for its basic analysis. Every color is thus analyzed in terms of red, green, and blue. These primaries are approximated by the transmissions of the Wratten A, B, and C type filters. In photographic reproduction processes, such analysis is made by photographing the object by a combination of filters and specially sensitized emulsions so that three image patterns are obtained, each the record of a single primary color.

The pattern of the blue primary is initially a colorless silver image. It represents the intensities of the blue primary as they are present in the original. It does not represent the pattern of the green or red primary. Hence, when this pattern is to be converted into color, the color must be of such character that it will reproduce the pattern of the blue primary and not affect the pattern of the red or green primary. The blue primary record is transformed into a dye image which will absorb the blue, but which will transmit completely the red and green primary, to wit, a yellow image. Since this color transmits completely two of the three primaries and absorbs the third, it has become customary to call it a secondary color. Likewise, the magenta and cyan colors into which the green and red primary records are converted are termed secondaries, since they respectively absorb green and red and transmit blue and red and blue and green.

The secondaries available to the color technicians do not always fulfill completely the practical requirements. Generally speaking, all dyes absorb all three primaries to some extent. To the extent to which the undesirable and unwanted absorptions take place, color degradation and distortion also takes place. It has ever been the object of the color technician to find dyes that would approach the theoretical ideal.

In subtractive color photography, the subtractive primaries should absorb, as completely as possible, the light of a single primary range and transmit, as completely as possible, the light of the other two primary ranges. Where such a dye does not transmit two primaries efficiently, that dye is degraded with respect to the colors of such primaries. Thus, a magenta dye which should transmit the red and blue primaries completely is degraded to the extent that it absorbs red or blue light.

To overcome the shortcomings of the available dyes, it has often been suggested to combine the normal processing with a technique known to those skilled in the art as masking. Suppose that the magenta secondary has an appreciable absorption of blue. This is highly undesirable, since it imposes a pattern of the greens upon the pattern of blues, hence falsifying the blue primary record to this extent. If a record is made of the green primaries, which is opposite in character to the blue primary record, and the two are registered, green densities will be subtracted from the blue to the extent to which the magenta dye imposes them. Hence, a rectification by cancellation occurs.

If the cyan dye also absorbs blue and if its absorption is to a different extent than that of the magenta, then it will be necessary to utilize two records, one of the green, the other of the red, with which to completely correct the blue rendition of the color reproduction. Each of these records will be developed to a different contrast, since the blue absorptions of the cyan and magenta are different. Similarly, the green primary record will require two totally different corrections to cancel out the degradations (undesired absorptions) of the cyan and yellow secondaries. This is very difficult to achieve and it intensifies problems of registry, definition, and the possibility of retaining high photographic quality. For this reason, it has been the normal custom in masking to neglect the degradations imposed by the red absorptions of the yellow and magenta primaries. In other special schemes it has become customary to correct only for the secondary, giving the maximum degradation.

It is, therefore, an object of the present invention to provide a new multi-layer color film containing a mixture of dye image intermediates in all layers so that, after exposure and processing, the individual dye images in each layer of the film contain substantially equal degrees of dye image degradation.

Another object is to provide a multi-layer color negative containing equally degraded dye images in each of the individual layers.

Another object is to provide a multi-layer color film in which each individual layer contains a mixture of dye image intermediates so as to yield color images of substantially equal color degradation.

Another object is to provide a multi-layer color film which has completely corrected records of the original primary colors.

A further object is to provide a method for the manufacture of said multi-layer color film.

Other objects will appear from the following description of my invention.

These objects are accomplished by providing a multi-layer color film containing a mixture of dye image intermediates in each of the individual layers so that, after exposure and dye image formation, each of the three dye images, which together form the image in the color film, are degraded to substantially the same extent. By this procedure it becomes very easy to make complete corrections in the color film by using but a single mask for all three primary records. In other words, instead of employing dyes or color-forming components yielding dyes, which will have a minimum of degradation, the degradation of the individual dye images, produced from the dye image intermediates, is increased to such an extent that each dye image, resulting from exposure and processing, is degraded to approximately the same extent. Such a multilayer color film yields a dye image which is highly degraded with black. When a penchromatic record of the color image, opposite in character to it, and equal to the amount of degradation present, is registered with the color reproduction, copies made from the combination using the primaries for exposure, will contain completely corrected records of the original primaries. The same mask will serve for all three records.

By the term "dye image intermediates," as employed herein, is meant an organic color yielding component such as cyan, magenta, and yellow color-formers usually employed in photographic film as described in United States Patents 2,323,590; 2,324,832; 2,357,395; 2,403,329; 2,186,685; 2,265,221; 2,307,399; 2,411,951; 2,154,-918; 2,214,483; 2,320,422; and 2,376,679, hydrophilic synthetic polymer color-formers, containing a plurality of aliphatic alcohol hydroxyl groups, such as, for example, a condensate obtained from an acetal of polyvinyl alcohol with salicylaldehyde (U. S. P. 2,397,864, Example 1), condensate obtained from an acetal of polyvinyl alcohol and phenylmethyl pyrazolone carboxylic acid (U. S. P. 2,320,422, Example VIII), and condensate obtained from an acetal of polyvinyl alcohol and acetoacetaminophenyl carboxylic acid (U. S. P. 2,320,422, Example IX), capable of forming dye images upon color-forming development, and bleachable cyan, magenta, and yellow dyes, capable of forming dye images upon bleaching in the presence of silver.

With materials where the dye image intermediates are present in the emulsions, and the dye images are formed by color development, it is especially easy to achieve the desired result. A sensitometric strip serves as the guide. A sensitometric strip of the magenta dye image is prepared and the readings made with the red, green, and blue primaries. The readings are plotted in the normal manner. Let us suppose that the plot of the green densities indicates a gamma of reproduction of 1.50, that of the blue densities a value of 0.60, and that of the red densities a value of 0.15. Then we say that the blue degradation is 40%

$$\left(\text{equal to } \frac{0.60}{1.50}\right)$$

and the red degradation 10%

$$\left(\text{equal to } \frac{0.15}{1.50}\right)$$

Generally it will be found desirable to degrade all the secondaries so that they match the worst degradation present in any one secondary. Thus, if the blue absorption of the magenta dye image is such that a 40% degradation is indicated, and if this be the largest degree of degradation present in all the secondaries, then it will be desirable to increase the red absorption of the magenta, the blue and green absorptions of the cyan, and the red and green absorptions of the yellow, so that they each equal or approach 40%. This is accomplished by adding a cyan dye image intermediate to the magenta, then preparing a sensitometric strip of the new combination, reading and plotting the red, green, and blue densities, and noting the approach to the desired result. By making a series of trials, the correct combination can readily be determined.

If the dye images are formed by the dye destruction processes, then each secondary is degraded by the addition of the other members of the set, to such an extent that the sensitometric curves show the proper degree of degradation.

The color film, prepared in accordance with the present invention, is particularly desirable where integral masking is used, i. e., where the mask is an integral part of the monopack film which carries the color images and is formed during the processing of this film. In the past it has only been possible for such integral masks to provide partial color correction, usually for the blues, in the manner described in U. S. Patents 2,357,388 and 2,253,070. With such a multilayer color film, an integral mask can be formed which will provide full color correction and at the same time permit the use of a simpler processing procedure.

In practicing the present invention, a multilayer film is prepared as follows: Suppose 50% is the blue degradation of the magenta dye and that this is the worst primary degradation which is present in the three secondary image dyes. A red dye sensitive silver-halide emulsion is prepared in the usual manner. To this red sensitive emulsion is added a cyan dye image intermediate and sufficient quantities of magenta and yellow image intermediates, so that H. and D. characteristics, when read through the red, green, and blue filters, will yield a red contrast that is approximately two times the contrast of the blue or the green, and the blue and green contrasts are equal to each other. This can be determined as follows:

The emulsion containing the dye image intermediates is exposed in a sensitometer and processed in the usual manner to yield a color image. The different steps in the image are then measured in a color densitometer to determine the red, green, and blue densities. The plot of these densities will then show the relative contrast of the red, green, and blue components of the dye image. The desired result is achieved when the ratio of the red contrast to the contrast of the green or the blue is 2:1.

A green sensitive silver-halide emulsion, containing a magenta dye image intermediate, is prepared in the usual manner. To this emulsion a cyan dye image intermediate is added in a sufficient quantity so that the green contrast will have approximately two times the contrast of either the blue or the red which are equal to each other.

A blue sensitive silver-halide emulsion, containing a yellow dye image intermediate, is prepared in the usual manner. To this emulsion a mixture of magenta and cyan dye image intermediates is added in a sufficient quantity so as yield a dye image in which the blue contrast will have two times the contrast of the red or green densities.

The color densities of the foregoing two emulsions are determined in the same manner as that given for the red sensitive emulsion.

Figure 2:
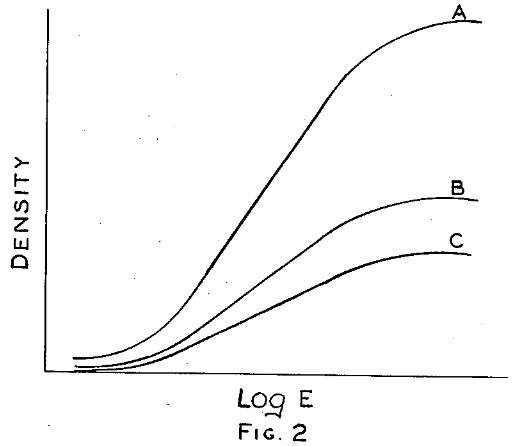
Figure 3:
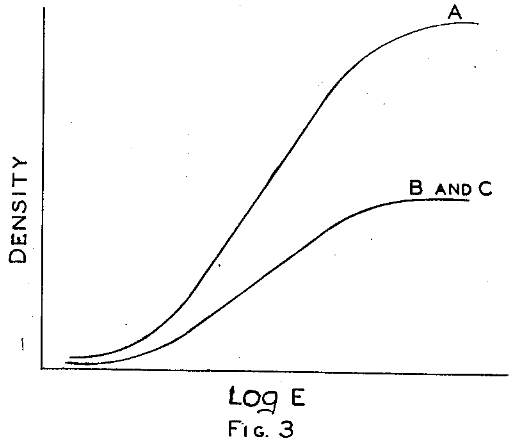

The present invention is illustrated by the accompanying drawing in which Figures 1 to 3 represent typical characteristic curves of the color densities in the preliminary intermediate and final red sensitive layer prior to coating.

In Figures 1 to 3, wherein the ordinates represent densities, and the abscissa represent the log of exposure, A, B, and C represent the red, green, and blue densities, respectively, of the color image formed in the preliminary, intermediate, and final layers.

The following examples will illustrate the preparation of the multi-layer color film containing an admixture of degraded dye image intermediates in each of the respective layers. The percentages given are in parts by weight.

EXAMPLE I

*Preliminary emulsion*

(*a*) To a kilogram of a wet gelatino silver-halide emulsion, containing about 10% gelatin, 4–5% of silver-bromoiodide, 10 cc. of a 10% solution of saponin and 20 mgs. of 5-[1-phenyl-2-(3-ethyl-6,7-tetrahydrobenzothiazolylidene-2)-ethylidene]-2-(3-ethyl-4,5-diphenylthiazolylidene-2-methylene)-4-keto-4,5-dihydrothiazole allyliodide, there were added 13.5 grams of a cyan color-former, 2-stearylamino carboxy 4-sulfo-α-naphthol, of the following formula:

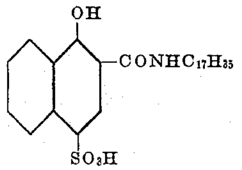

A small portion of this emulsion was coated upon a cellulose acetate film base and dried. A strip of the dried film was exposed in a sensitometer, developed, and processed to a color image in the usual manner. The strip was then read in a color densitometer through the red, green, and blue filters, and the density curves obtained plotted as A, B, and C, as illustrated in Figure 1. From this figure, it will be observed that the contrast of the blue (C) and green (B) densities is considerably below one-half of the contrast of the red (A) densities; that is, they have values of 0.3 and 0.2, whereas one-half of the contrast is 0.75.

*Intermediate emulsion*

(*b*) To a kilogram of a wet gelatino silver-halide emulsion as above prepared, 3.5 grams of a magenta color-former, 1-(4'-phenoxy-3'-sulfophenyl)-3-stearyl-5-pyrazolone, were added in addition to 13.5 gms. of the above cyan color-former. The magenta color-former has the following formula:

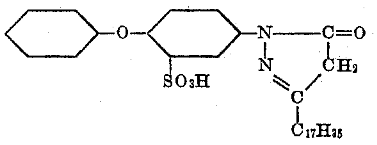

A small portion of this emulsion was coated upon a cellulose acetate film base and dried. A strip of the dried film was exposed in a sensitometer, developed, and processed to a color image in the usual manner. The strip was then read in a color densitometer through the red, green, and blue filters, and the density curves obtained plotted as A, B, and C, as illustrated in Figure 2. From this figure, it will be observed that although the green contrast (B) has been brought up to the point where it is now one-half of that of the red, the blue contrast (C) is still somewhat low.

*Final emulsion*

(*c*) To a kilogram of the foregoing wet gelatino silver-halide emulsion, containing the aforesaid amounts of the cyan and magenta color-former, 6.0 grams of a yellow color-former, p-stearylamino-benzoylacetamino-5-teraphthalic acid, characterized by the following formula were added:

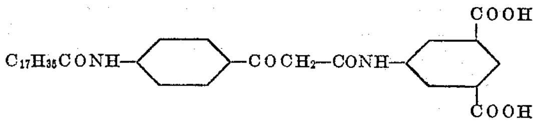

A small portion of this emulsion was dried, coated upon a cellulose acetate film base, exposed and developed, and processed to a color image. The strip was then read in a color densitometer through the red, green, or blue filters, and the density curves obtained plotted as A, B, and C, as illustrated in Figure 3. From this figure, it will be observed that now the red contrast (A) is twice that of the blue (C) or green (B), and that the blue and green contrast are equal.

By resorting to the foregoing procedure, a final gelatino silver-halide emulsion was obtained which, after coating, exposure, and processing, yielded a dye image that was degraded to an equal extent to the primaries it should transmit completely. This final red sensitive emulsion layer is now ready for coating upon a film base.

By resorting to the comparative testing procedure of the preceding example, the final green sensitive and blue sensitive emulsions were prepared as follows:

EXAMPLE II

*Final emulsions*

GREEN SENSITIVE

To a kilogram of a wet gelatino silver-halide emulsion, containing about 10% gelatin, 4–5% of silver-bromoiodide, 10 cc. of a 10% solution of saponin and 30 mgs. of 3,3',9-triethyl-5,5'-diphenyloxacarbocyanine iodide, there were added 8.0 grams of 2-stearylaminocarboxy-4-sulfo-α-naphthol, and 17.0 grams of 1-(4'-phenoxy-3'-sulfophenyl)-3-stearyl-5-pyrazolone.

BLUE SENSITIVE

To a kilogram of a wet gelatino silver-halide emulsion, constituted as above, but containing no sensitizing dye, 5 grams of 2-stearylamino-sulfo-α-naphthol, 3.5 grams of 1-(4'-phenoxy-3'-sulfophenyl)-3-stearyl-5-pyrazolone, and 15.0 grams of p-stearoylaminobenzolacetamino-5-teraphthalic acid were added.

*Coating*

The three final silver-halide emulsions, as above prepared, were coated to a dry thickness of approximately 6 microns upon a cellulose acetate film base containing an anti-halo coating. The red sensitive silver-halide emulsion was coated first. Over this coating the green sensitive emulsion was coated followed by a coating of approximately 3 microns dry thickness of a yellow filter prepared in accordance with United States Patents 2,036,546; 2,220,187 or 2,390,707. Over the filter layer the blue sensitive emulsion was coated as the outermost layer.

In processing the finished color film, the film is exposed and color developed in the usual manner. The product is a color negative composed of dye images superimposed upon each other. The nature of these images is such that the composite is equivalent to a black and white image upon which has been superimposed a color image. The nature of the black and white image is such that it can readily be neutralized by the addition to the product of a black and white silver masking image.

This can be accomplished by contact printing the color negative upon panchromatic black and white film. The film so exposed is developed to a gamma of approximately 0.5, to obtain a mask which is registered with the color negative. It will be found that all color degradations, due to improper absorption by the color-former, have been canceled out. From this combination it now becomes possible to make color separations in the normal manner so that the blue filter separation will represent only the blue densities imaged in the uppermost layer of the original film. The green filter image separation will represent only the green densities imaged in the middle or green sensitive layer of the original film. The red filter separation will represent only the red densities imaged in the bottom or red sensitive layer of the original film.

The same results can be obtained without the use of a separate mask, if after color development of the film, the negative silver images are converted into silver chloride by well-known methods, and the silver chloride removed by the action of such agents as saturated sodium sulfite, ammonium sulfite, potassium bromide, ammonium salts, etc. The residual silver-halides remaining in each layer are then exposed to white light and developed in a black and white developer to yield a color correcting silver image.

*Processing*

The film prepared as above was exposed and color developed for 15 minutes in a developer of the following composition:

| | |
|---|---|
| Sodium hexametaphosphate ________grams__ | 1 |
| Sodium bisulfite ____________________do____ | 1 |
| p-Aminodiethylaniline HCl __________do____ | 3 |
| Sodium carbonate (monohydrate) ____do____ | 60 |
| Hydroxylamine HCl _________________do____ | 1 |
| Potassium bromide _________________do____ | 1.5 |
| Water to make ____________________liters__ | 1 |

Short stopped for 3 minutes in a bath of the following composition:

| | |
|---|---|
| Sodium acetate ____________________grams__ | 20 |
| Acetic acid _____________cubic centimeters__ | 10 |
| Water to make _____________________liters__ | 1 |

Washed for 5 minutes in running water, and the washed film then treated in a bleach bath of the following composition:

| | |
|---|---|
| Sodium ferricyanide _______________grams__ | 50 |
| Sodium chloride ___________________do____ | 50 |
| Water to make _____________________liters__ | 1 |

The bleached film was then treated in a 20% solution of sodium sulfite, in order to remove the silver chloride formed during the bleaching treatment without appreciably effecting the silver bromide remaining in all the layers. The film was then re-exposed for about 3 minutes to light of a No. 1 photoflood lamp 30 inches away from the film so as to expose all of the remaining silver-halides. The re-exposed film was developed to a gamma of 0.5 in a black and white developer of the following composition:

| | |
|---|---|
| Metol ____________________________grams__ | 2 |
| Sodium sulfite ______________________do____ | 20 |
| Hydroquinone _______________________do____ | 4 |
| Sodium carbonate ___________________do____ | 80 |
| Potassium bromide __________________do____ | 4 |
| Water to make ____________________liters__ | 1 |

The developed film was then fixed for 3 minutes in a solution of the following composition:

| | |
|---|---|
| Hypo ____________________________grams__ | 200 |
| Borax ____________________________do____ | 10 |
| Water to make _____________________liters__ | 1 |

After fixing, the film was washed for 10 minutes in running water, and allowed to dry.

The color negative thus obtained contains three superimposed dye images of substantially equal degrees of dye image degradation, together with silver positive images in each of the three layers, sufficient in contrast to neutralize the degradation present in each layer.

In preparing multi-layer color film of the reversal type the same final emulsions are used as in the preparation of color negative material with the exception that the silver halide emulsions are of the type used in the manufacture of reversal type film. The processing of such film is changed to conform to the normal reversal color development procedure which, after exposure, consists in developing the film in a black and white developer designed for reversal development, washing the film, exposing to white light, color developing, bleaching, fixing, washing, and drying. The color positive film thus obtained contains three superimposed dye images of substantially equal degrees of dye image degradation. This color positive film, in combination with a mask processed to a gamma of 0.5, will serve either as a master from which complete color corrected negative separations can be made by the usual color separation methods, or as a corrected master for direct printing on another multi-layer color film.

In the preparation of multi-layer color film, in which after exposure the dye images are obtained by the silver dye bleach process, the final three emulsions were prepared by resorting to the comparative testing procedure of Example I as follows:

EXAMPLE III

*Final emulsions*

Three kilograms of a wet gelatino silver-halide emulsion, containing about 10% gelatin, 4–5% of silver-bromoiodide, 10 cc. of a 10% solution of saponin, and 10 grams of diphenyl biguanide hydrochloride were separated into three equal portions of 1 kilogram each and utilized in the preparation of the final red, green, and blue sensitive emulsions.

RED SENSITIVE

To the first portion of the wet gelatino silver-halide emulsion there were added 30 mgs. of a red sensitizer 5-[1-phenyl-2-(3-ethyl-6,7-tetrahydrobenzobenzothiazolylidene-2) - ethylidene]-

2-(3-ethyl-4,5-diphenylthiazolylidene - 2-methylene)-4-keto-4,5-dihydrothiazole allyl iodide, 5 grams of a bleachable cyan dye, Direct Sky Blue (C. I. #520), and .89 gram of a bleachable yellow dye, Dianil Yellow 2R (C. I. #650).

GREEN SENSITIVE

To the second portion of the wet gelatino silver-halide emulsion there were added 30 mgs. of 3, 3[1], 9-triethyl-5,5[1]-diphenyloxacarbocyanine iodide, 1.25 grams of a bleachable cyan dye, Direct Sky Blue (C. I. #520), 3.5 grams of a bleachable magenta dye, Fast Acid Magenta B (C. I. #30), and 1.3 grams of a bleachable yellow dye, Dianil Yellow 2R (C. I. #650).

BLUE SENSITIVE

To the third portion of the wet gelatino silver-halide emulsion there were added an additional 5 grams of diphenyl biguanide hydrochloride as a dye precipitant, 6.8 grams of a bleachable yellow dye, Dianil Yellow 2R (C. I. #650), 0.7 gram of a bleachable magenta dye, Fast Acid Magenta B (C. I. #30), and 1.25 grams of a bleachable cyan dye, Direct Sky Blue (C. I. #520).

*Coating*

The three final silver-halide emulsions, as above prepared, were coated to a dry thickness of approximately 6 microns upon a cellulose acetate film base in the same coating order as in Example II.

*Processing*

The finished film, prepared in accordance with the foregoing, was exposed and developed for 15 minutes in a black and white developer of the following composition:

| | | |
|---|---|---|
| Water | cubic centimeters | 750 |
| Metol | grams | 1.5 |
| Sodium sulfite (anhydrous) | do | 80 |
| Hydroquinone | do | 3 |
| Potassium bromide | do | 0.5 |
| Water to make | liters | 1 |

Short stopped for 3 minutes in a bath of the following composition:

| | | |
|---|---|---|
| Sodium acetate | grams | 20 |
| Acetic acid | cubic centimeters | 10 |
| Water to make | liters | 1 |

Fixed for 3 minutes in a solution of the following composition:

| | | |
|---|---|---|
| Water | cubic centimeters | 650 |
| Hypo | grams | 240 |
| Sodium sulfite (anhydrous) | do | 15 |
| Acetic acid (28% aqueous solution) | cubic centimeters | 45 |
| Potassium alum | grams | 15 |
| Water to make | liters | 1 |

The fixed film was then treated for 10–15 minutes in a dye bleach of the following composition:

| | | |
|---|---|---|
| Thiourea | grams | 70 |
| Hydroquinone | do | 30 |
| Chrome alum | do | 50 |
| Sulfuric acid (conc.) | cubic centimeters | 5 |
| 2,3-diaminophenazine | grams | 0.2 |
| Water to make | liters | 1 |

After dye bleaching, the film was washed for several minutes in running water and then treated for 10 minutes in a silver bleach bath of the following composition:

| | | |
|---|---|---|
| Copper sulfate | grams | 100 |
| Potassium bromide | do | 25 |
| Water to make | liters | 1 |

The bleached film was washed, fixed, washed, and dried.

The color positive film thus obtained contains three superimposed dye images of substantially equal degrees of dye image degradation in each of the three layers. This color positive film, in combination with a black and white silver mask processed to a gamma of 0.5, can also serve as a master from which complete color corrected negative separations can be made by the usual color separation methods.

The color film, as above prepared, may also be processed to yield a master positive containing color corrected masks in each layer. After exposure, development, fixation, and dye bleaching by the method outlined above, the film is washed. After washing, the remaining unaffected silver is bleached to silver-halide using the copper bleach bath mentioned above. The film is then washed, exposed to light, and developed in a black and white developer, such as a normal metol-hydroquinone developer, and the development carried, so as to yield a final silver image in each layer, to a gamma of approximately 0.5. The film is then fixed, washed, and dried.

The dried film is composed of three superimposed dye images of substantially equal degrees of dye image degradation and a silver image opposite in character to the dye images in each of the three layers. The combination of the two in each layer yields a master positive from which fully color corrected negatives can be made in the normal manner without the use of any separate or auxiliary image.

It is to be noted that the amounts of the cyan, magenta, and yellow dye image intermediates utilized will depend on the type of emulsion used and the chemical constitution of the dye image intermediates. In general, however, the exact amount of any cyan, magenta, and yellow dye image intermediate, to be used for a given silver-halide emulsion, can be very readily ascertained by a few comparative tests by resorting to the testing procedure outlined in Example I.

In the preparation of a multi-layer color film, either of the negative type or of the reversal type, it is not necessary to incorporate the mixture of the color-formers in each of the respective layers. It is possible to place them in auxiliary layers coated adjacent to the emulsion in the manner described in United States Patents 2,350,380 and 2,397,452.

Instead of incorporating the color-forming components into the emulsion layers, the mixture of the cyan, magenta, and yellow color-formers can be added to the developing solution as disclosed in United States Patent 2,252,718. In this case the monopack material consists of three superimposed silver-halide emulsions which are free from color components. After exposure, the film is developed in a normal black and white developer designed for reversal development. After washing, the film may be treated in the following manner:

Assume again that the magenta image dye is the worst and has 50% degradation in the blue. The film is exposed to red light. This will cause only the red sensitive layer to become developable. It is then developed in a color developer to which has been added the proper mixture of cyan, magenta, and yellow color-formers in such a ratio as to yield a dye image in which the gamma of the red densities is twice that of the blue or green densities, the latter two being substantially equal to each other.

The amount of each of the color-formers of the mixture of the cyan magenta, and yellow color-formers to be added to the developer is determined by resorting to the comparative testing procedure outlined in Example I. After development, the film is washed and exposed through the front, i. e., outermost layer, to blue light. This exposure will cause the grains in the outermost layer only to become developable. The film is now developed in a solution of a color developer containing a mixture of the three color-formers present to such an extent that the contrast of the blue densities will be twice that of the green or red densities, and these will be substantially equal to each other. The film is then washed and completely exposed to white light of sufficient intensity to make the green sensitive layer developable. It is then developed in a color developer containing a mixture of components present to such an extent that the green densities will have a contrast twice that of the blue or red. The latter two will be substantially equal to each other. The developed film is then treated with a bleach such as an aqueous solution of potassium ferricyanide containing potassium bromide, to convert all silver images into silver bromide. The latter is removed by treatment with a 20% hypo solution. The film is then washed and dried.

The film thus obtained contains three superimposed dye images of substantially equal degrees of dye image degradation in each of the three layers. In combination with a masking image developed to approximately a gamma of 0.5, the film will yield complete color corrected negative separations in the usual manner.

The following example is a specific illustration of the preparation of the final cyan, magenta, and yellow color-forming developers for the development of a multi-layer color film prepared in accordance with the description in United States Patent 2,252,718, page 1, column 2, lines 26 et seq.

EXAMPLE IV

*Cyan color forming developer*

SOLUTION A

| | |
|---|---|
| 2-amino-5-diethylaminotoluene HCl ________________grams__ | 2.05 |
| Sodium sulfite (anhydrous) _______do____ | 20.00 |
| Sodium sulfate ________________do____ | 40.00 |
| Sodium carbonate (anhydrous) ___do____ | 40.00 |
| Potassium bromide ______________do____ | 2.00 |
| Water to make _______cubic centimeters__ | 950.00 |

SOLUTION B

| | |
|---|---|
| 2,4-dichloro-1-naphthol ____________grams__ | 5 |
| Acetoacetanilide ____________________do____ | 2 |
| 1-phenyl-3-methyl-5-pyrazolone _____do____ | 2 |
| Sodium hydroxide ___________________do____ | 8 |
| Water to make __________cubic centimeters__ | 50 |

Solution B was added to Solution A.

*Magenta color-forming developer*

SOLUTION A

| | |
|---|---|
| p-Aminodiethylaniline HCl ________grams__ | 5 |
| Sodium sulfite (anhydrous) _________do____ | 10 |
| Sodium carbonate (anhydrous) _____do____ | 40 |
| Potassium bromide _________________do____ | 5 |
| Sodium sulfate _____________________do____ | 40 |
| Water to make _________cubic centimeters__ | 950 |

SOLUTION B

| | |
|---|---|
| 1-phenyl-3-methyl-5-pyrazolone _grams__ | 5.00 |
| 2,4-dichloro-1-naphthol ___________do____ | .05 |
| Sodium hydroxide ________________do____ | 8.00 |
| Water to make _______cubic centimeters__ | 50.00 |

Solution B was added to Solution A.

*Yellow color-forming developer*

SOLUTION A

| | |
|---|---|
| p-Aminodiethylaniline HCl ________grams__ | 5 |
| Sodium sulfite (anhydrous) _________do____ | 10 |
| Sodium carbonate (anhydrous) ______do____ | 40 |
| Potassium bromide _________________do____ | 5 |
| Sodium sulfate _____________________do____ | 40 |
| Water to make _________cubic centimeters__ | 950 |

SOLUTION B

| | |
|---|---|
| Acetoacetanilide ________________grams__ | 5.00 |
| 1-phenyl-3-methyl-5-pyrazolone ___do____ | 2.00 |
| 2,4-dichloro-1-naphthol ___________do____ | .05 |
| Sodium hydroxide ________________do____ | 8.00 |
| Water to make _______cubic centimeters__ | 50.00 |

Solution B was added to Solution A.

*Processing*

A monopack material consisting of three superimposed silver-halide emulsions, free from color components, was exposed and developed for 12 minutes in a black and white developer of the following composition:

| | |
|---|---|
| Metol ______________________________grams__ | 1 |
| Sodium sulfite (anhydrous) __________do____ | 50 |
| Hydroquinone ______________________do____ | 8 |
| Sodium carbonate (anhydrous) ______do____ | 30 |
| Potassium bromide _________________do____ | 5 |
| Potassium thiocyanate ______________do____ | 9 |
| Water to make ______________________liters__ | 1 |

Washed for 4 minutes in running water, reexposed to red light, and developed in a cyan developer as above prepared for 4 minutes.

The film was washed in running water, reexposed through the emulsion side to blue light and then developed in a yellow developer as above prepared for 11 minutes.

The film was then washed in running water and given an exposure to white light for 4 minutes and developed in the magenta color-forming developer for 11 minutes. The color developed film was then treated in a bleach bath of the following composition:

| | |
|---|---|
| Potassium ferricyanide ___________grams__ | 120 |
| Potassium bromide ________________do____ | 60 |
| Water to make _____________________liters__ | 1 |

During the bleaching treatment all the silver was bleached to silver bromide in all the layers. The film was then fixed in a 20% hypo solution, washed and then dried.

The principle of the present invention is also applicable to the preparation of multi-layer color film in which each element bears a color yielding layer comprising a hydrophilic film-forming synthetic polymer containing a plurality of hydroxyl groups and having a plurality of color-former structural components and, in addition, containing light sensitive silver salts as described in United States Patents 2,397,864-5-6 and 7. The procedure in this case is to use the proper mixture of the respective film-forming synthetic polymers, containing as a part of their molecular structure, color-former nuclei or components capable of forming indophenol or azo-methine dyes, in each of the red, green, and yellow layers in the same manner as hereinbefore described.

The following is an illustrative example of the preparation of a multi-color film containing hydrophilic synthetic polymers.

EXAMPLE V

*Final emulsions*

RED SENSITIVE

To a kilogram of light-sensitive color-former dispersion, prepared in accordance with Example 1 of U. S. P. 2,397,864, there were added 300 cc. of a 5% diluted alkali solution of the condensate obtained from polyvinyl alcohol acetalized with m-amino-benzaldehyde and condensed with phenylmethyl-pyrazolone carboxylic acid (described in U. S. P. 2,320,422, Example VIII) and 250 cc. of a 12% dilute alkali solution of a product obtained from polyvinyl alcohol acetalized with aminobenzaldehyde and condensed with aceto-acetaminophenyl carboxylic acid (described in Example IX, U. S. P. 2,320,422). The mixture was sensitized to red with 1,1′-diethyl-2,2′-naphthcarbo-cyanine iodide.

GREEN SENSITIVE

To a kilogram of a light-sensitive emulsion of Example VI of U. S. P. 2,397,864, there were added 350 cc. of the cyan polymer but containing no silver bromide, and 250 cc. of a 12% dilute alkali solution of a yellow hydrophilic synthetic color polymer prepared in accordance with Example IX of U. S. P. 2,320,422. The mixture was sensitized to green with 1,1′-diethyl-2,2′-cyanine iodide.

BLUE SENSITIVE

To a kilogram of a light-sensitive composition of Example VII of U. S. P. 2,397,864, which is sensitive to blue only, there were added 300 cc. of a cyan color-former dispersion prepared in accordance with Example I of U. S. P. 2,397,864, but containing no silver bromide, and 250 cc. of a 12% solution of the magenta color-forming dispersion prepared in accordance with Example VI of the same patent and containing no silver bromide.

*Coating*

The three final dispersions, as above prepared, were coated to a dry thickness of approximately 6–8 microns upon a cellulose acetate film base and in the same coating order, i. e., red, green, blue, with the exception that between the green sensitive and blue sensitive layer, a polyvinyl alcohol dispersion containing colloidal silver was coated.

*Processing*

This film, when exposed to a colored object and developed to a color image in a primary aromatic amino developing solution of Example I, gave a three-color picture in complementary colors upon removal of the silver and silver salts. Alternatively, the film may be processed by a reversal method as in Example III whereby a reproduction of the original scene is obtained.

While the present invention has been described in considerable detail with reference to certain preferred procedures, materials, and uses, it is understood that the invention is not limited thereto, that numerous variations may be made in the procedures herein described, and that equivalent materials may be substituted. Thus, for example, the sensitizing dyes, dye image intermediates and dye precipitants, other than those specifically mentioned and utilized in the foregoing examples, may be used with satisfactory results. All such modifications and variations are within the scope of the invention as defined by the following claims.

I claim:

1. A multilayer photographic color film comprising a support bearing superimposed red, green and blue sensitive silver halide emulsion layers containing color formers capable of yielding upon exposure and development with a primary aromatic amino developing agent a dye selected from the group consisting of azomethine and quinoneimine dyes complementary in color to the sensitivity of the layer, said dyes having original undesired absorption gammas in the spectral regions in which they should be fully transmittant, the red, green and blue sensitive layers containing in addition a minor amount of a mixture of magenta and yellow, yellow and cyan, and cyan and magenta color formers, respectively, in such proportions that all of said undesired absorption gammas are raised approximately to the same value represented by a gamma at least as high as the highest of said original undesired absorption gammas.

2. A multilayer photographic color film comprising a support bearing superimposed red, green and blue sensitive silver halide emulsion layers containing color formers capable of yielding upon exposure and development with a primary aromatic amino developing agent a dye selected from the group consisting of azomethine and quinoneimine dyes complementary in color to the sensitivity of the layer, said dyes having original undesired absorption gammas in the spectral regions in which they should be fully transmittant, the red sensitive layer containing in addition a minor amount of a magenta color former, and the green and blue sensitive layers containing in addition a minor amount of a mixture of yellow and cyan and cyan and magenta color formers, respectively, in such proportions that all of said undesired absorption gammas are raised approximately to the same value represented by a gamma at least as high as the highest of said original undesired absorption gammas.

3. A multilayer photographic color film comprising a support bearing superimposed red, green and blue sensitive silver halide emulsion layers containing color formers capable of yielding upon exposure and development with a primary aromatic amino developing agent a dye selected from the group consisting of azomethine and quinoneimine dyes complementary in color to the sensitivity of the layer, said dyes having original undesired absorption gammas in the spectral regions in which they should be fully transmittant, the red sensitive layer containing in addition a minor amount of a yellow color former and the green and blue sensitive layers containing a mixture of yellow and cyan and cyan and magenta color formers, respectively, in such proportions that all of said undesired absorption gammas are raised approximately to the same value represented by a gamma at least as high as the highest of said original undesired absorption gammas.

4. A multilayer photographic color film comprising a support bearing superimposed red, green and blue sensitive silver halide emulsion layers containing color formers capable of yielding upon exposure and development with a primary aromatic amino developing agent a dye selected from the group consisting of azomethine and quinoneimine dyes complementary in color to the sensitivity of the layer, said dyes having original undesired absorption gammas in the spectral regions in which they should be fully transmittant, the green sensitive layer containing in addition a minor amount of a cyan color former and the red and blue sensitive layers containing in addition a minor amount of a mixture of magenta and yellow and cyan and magenta color formers, respectively, in such proportions that all of said undesired absorption gammas are raised approximately to the same value represented by a gamma at least as high as the highest of said original undesired absorption gammas.

5. A multilayer photographic color film comprising a support bearing superimposed red, green and blue sensitive silver halide emulsion layers containing color formers capable of yielding upon exposure and development with a primary aromatic amino developing agent a dye selected from the group consisting of azomethine and quinoneimine dyes complementary in color to the sensitivity of the layer, said dyes having original undesired absorption gammas in the spectral regions in which they should be fully transmittant, the green sensitive layer containing in addition a minor amount of a yellow color former and the red and blue sensitive layers containing in addition a minor amount of a mixture of magenta and yellow and cyan and magenta color formers, respectively, in such proportions that all of said undesired absorption gammas are raised approximately to the same value represented by a gamma at least as high as the highest of said original undesired absorption gammas.

6. A multilayer photographic color film comprising a support bearing superimposed red, green and blue sensitive silver halide emulsion layers containing color formers capable of yielding upon exposure and development with a primary aromatic amino developing agent a dye selected from the group consisting of azomethine and quinoneimine dyes complementary in color to the sensitivity of the layer, said dyes having original undesired absorption gammas in the spectral regions in which they should be fully transmittant, the blue sensitive layer containing in addition a minor amount of a magenta color former and the red and green sensitive layers containing in addition a minor amount of a mixture of magenta and yellow and yellow and cyan color formers, respectively, in such proportions that all of said undesired absorption gammas are raised approximately to the same value represented by a gamma at least as high as the highest of said original undesired absorption gammas.

7. A multilayer photographic color film comprising a support bearing superimposed red, green and blue sensitive silver halide emulsion layers containing color formers capable of yielding upon exposure and development with a primary aromatic amino developing agent a dye selected from the group consisting of azomethine and quinoneimine dyes complementary in color to the sensitivity of the layer, said dyes having original undesired absorption gammas in the spectral regions in which they should be fully transmittant, the blue sensitive layer containing in addition a minor amount of a cyan color former and the red and green sensitive layers containing in addition a minor amount of a mixture of magenta and yellow and yellow and cyan color formers, respectively, in such proportions that all of said undesired absorption gammas are raised approximately to the same value represented by a gamma at least as high as the highest of said original undesired absorption gammas.

8. A multilayer photographic color film comprising a support bearing superimposed red, green and blue sensitive silver halide emulsion layers containing color formers capable of yielding upon exposure and development with a primary aromatic amino developing agent a dye selected from the group consisting of azomethine and quinoneimine dyes complementary in color to the sensitivity of the layer, said dyes having original undesired absorption gammas in the spectral regions in which they should be fully transmittant, each layer containing in addition a minor amount of a mixture of the color formers for the other two layers in such proportions that all of said undesired absorption gammas are raised approximately to the same value represented by a gamma at least as high as the highest of original undesired absorption gammas.

9. A multilayer photographic color film comprising a support bearing superimposed red, green and blue sensitive silver halide emulsion layers containing color formers capable of yielding upon exposure and development with a primary aromatic amino developing agent a dye selected from the group consisting of azomethine and quinoneimine dyes complementary in color to the sensitivity of the layer, said dyes having original undesired absorption gammas in the spectral regions in which they should be fully transmittant, two of said layers containing, in addition, a minor amount of a mixture of the color formers for the other two layers, the third layer containing in addition a minor amount of at least one of the color formers for the other two layers, said additions being in such proportions that the gammas of all of said undesired absorptions are raised approximately to the same value which is represented by a gamma at least as high as the highest gamma of said original undesired absorptions, said gammas being measured in the regions of undesired absorptions.

HAROLD C. HARSH.

REFERENCES CITED

The following references are of record in the file of this patent:

UNITED STATES PATENTS

| Number | Name | Date |
|---|---|---|
| 2,032,401 | Clark | Mar. 3, 1936 |
| 2,207,631 | Goldfinger | July 9, 1940 |
| 2,268,630 | Wilmanns et al. | Jan. 6, 1942 |
| 2,294,731 | Eggert et al. | Sept. 1, 1942 |
| 2,294,981 | Hanson | Sept. 8, 1942 |

FOREIGN PATENTS

| Number | Country | Date |
|---|---|---|
| 621,804 | Germany | Nov. 14, 1935 |
| 550,688 | Great Britain | Jan. 20, 1943 |